(12) United States Patent
Whang

(10) Patent No.: US 10,764,399 B2
(45) Date of Patent: Sep. 1, 2020

(54) CUSTOMIZED WEB SERVICES GATEWAY

(71) Applicant: ADP, LLC, Roseland, NJ (US)

(72) Inventor: Yeon Whang, Alpharetta, GA (US)

(73) Assignee: ADP, LLC, Roseland, NJ (US)

( * ) Notice: Subject to any disclaimer, the term of this patent is extended or adjusted under 35 U.S.C. 154(b) by 24 days.

(21) Appl. No.: 16/259,864

(22) Filed: Jan. 28, 2019

(65) Prior Publication Data
US 2020/0244767 A1    Jul. 30, 2020

(51) Int. Cl.
*H04L 29/08*     (2006.01)
*H04L 29/06*     (2006.01)
*G06F 16/955*    (2019.01)
*G06F 16/903*    (2019.01)

(52) U.S. Cl.
CPC ...... *H04L 67/327* (2013.01); *G06F 16/90344* (2019.01); *G06F 16/955* (2019.01); *H04L 67/40* (2013.01); *H04L 67/42* (2013.01); *H04L 67/02* (2013.01)

(58) Field of Classification Search
None
See application file for complete search history.

(56) References Cited

U.S. PATENT DOCUMENTS

| | | |
|---|---|---|
| 8,909,736 B1 | 12/2014 | Bosch et al. |
| 2012/0079009 A1 | 3/2012 | Carter et al. |
| 2012/0191840 A1 | 7/2012 | Gordon |
| 2016/0344841 A1* | 11/2016 | Wang ............... H04L 67/12 |
| 2017/0111321 A1 | 4/2017 | Saheba et al. |
| 2017/0111444 A1 | 4/2017 | Saheba et al. |
| 2017/0111475 A1 | 4/2017 | Saheba et al. |
| 2017/0111476 A1 | 4/2017 | Saheba et al. |

\* cited by examiner

*Primary Examiner* — Jeffrey R Swearingen
(74) *Attorney, Agent, or Firm* — Yee & Associates, P.C.

(57) ABSTRACT

A method and apparatus for facilitating access to a resource. A gateway receives a request from a client. The request includes a uniform resource identifier that references an interface associated with the resource. The gateway identifies a method type of the request and a path component count of path components in the uniform resource identifier. The gateway successively matches path components of the uniform resource identifier to a corresponding character sequence in a set of candidate sequences. The set of candidate sequences is identified based on the method type, the path component count, and any previously matched corresponding character sequences. The gateway identifies a context resource identifiers for the resource based on the method type, the path component count, and the matched corresponding character sequences. The gateway sends the request to the resource according to the context resource identifiers.

27 Claims, 7 Drawing Sheets

CUSTOMIZED WEB SERVICES GATEWAY

BACKGROUND INFORMATION

1. Field

The present disclosure relates generally to a web services system and, in particular, to a gateway within a web services system. Still more particularly, the present disclosure relates to a method and apparatus for facilitating access to a requested web service.

2. Background

Many organizations use different software systems for various purposes related to information discovery, business management, and other types of operations. Software systems often exchange data with each other. A web services architecture enables these software systems to exchange this data over one or more computer networks. A software system that requests data may be referred to as a service requester. The software system that processes the request and provides the data may be referred to as a service provider.

The exchange of data between service requestors and service providers may occur over one or more computer networks, which may include the Internet, some other type of public network, a private network, or some combination thereof. Managing multiple service requestors and multiple service providers over time may be more difficult and time-consuming than desired. This type of management may be especially time-consuming and difficult when the service providers belong to a private network and one or more of the service requestors belong to a public network.

For example, in some cases, only certain service requestors may be authorized to access or exchange data with a particular service provider that belongs to a private network. The policy governing which service requestors are, and which service requestors are not, authorized to access a particular service provider may be managed by an application programming interface (API) associated with the particular service provider.

API communication is essential in any application architecture. Service providers may manage thousands of canonical API paths which represent resources in the system of records. Because different governing policies may be associated with each API resource, each incoming HTTP request resource path must be matched to one of the canonical API paths. However, the canonical API paths often include dynamic path components. Because these API paths are not static, matching incoming HTTP request resource paths to one of the API paths is difficult.

In a service environment where all communications between services are made through HTTP-API calls, this matching problem becomes more significant. Time delays in providing service access to service requestors may lead to time delays of tasks that users of the service requestors want to perform. When the users are employers, employees, organization members, corporate personnel, or members of other types of business entities, these time delays may affect overall performance and operational efficiency of the users and business entities.

Therefore, it would be desirable to have a method and apparatus that take into account at least some of the issues discussed above, as well as other possible issues.

SUMMARY

In one illustrative example, a method is provided for facilitating access to a resource. A gateway receives a request from a client. The request includes a uniform resource identifier that references an interface associated with the resource. The gateway identifies a method type of the request and a path component count of path components in the uniform resource identifier. The gateway successively matches path components of the uniform resource identifier to a corresponding character sequence in a set of candidate sequences. The set of candidate sequences is identified based on the method type, the path component count, and any previously matched corresponding character sequences. The gateway identifies a context resource identifiers for the resource based on the method type, the path component count, and the matched corresponding character sequences. The gateway sends the request to the resource according to the context resource identifiers.

In another illustrative example, an apparatus comprising a gateway is provided. The gateway receives a request from a client. The request includes a uniform resource identifier that references an interface associated with the resource. The gateway identifies a method type of the request and a path component count of path components in the uniform resource identifier. The gateway successively matches path components of the uniform resource identifier to a corresponding character sequence in a set of candidate sequences. The set of candidate sequences is identified based on the method type, the path component count, and any previously matched corresponding character sequences. The gateway identifies a context resource identifiers for the resource based on the method type, the path component count, and the matched corresponding character sequences. The gateway sends the request to the resource according to the context resource identifiers.

In yet another illustrative example, a computer program product is provided for facilitating access to a resource. The computer program product comprises a non-transitory computer readable storage media, and program code stored thereon. The program code includes code for receiving a request from a client. The request includes a uniform resource identifier that references an interface associated with the resource. The program code includes code for identifying a method type of the request and a path component count of path components in the uniform resource identifier. The program code includes code for successively matching path components of the uniform resource identifier to a corresponding character sequence in a set of candidate sequences. The set of candidate sequences is identified based on the method type, the path component count, and any previously matched corresponding character sequences. The program code includes code for identifying a context resource identifiers for the resource based on the method type, the path component count, and the matched corresponding character sequences. The program code includes code for sending the request to the resource according to the context resource identifiers.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize, and take into account, different considerations. For example, the illustrative embodiments recognize, and take into account, that it may be desirable to facilitate the exchange of data between multiple service requestors, and multiple service providers in a manner that saves time and reduces the overall difficulty associated with this process. In these illustrative examples, service requestors may be referred to as clients and service providers may be referred to as resources.

In computer programming, an application programming interface (API) is a set of routines, protocols, or tools used for building software applications. An API may express a software component in terms of its operations, inputs, outputs, and underlying types. An API may define functionalities that are independent of their respective implementations, which allows definitions and implementations to vary without compromising an interface. An API may make developing a software program easier by providing the building blocks for the software program. A programmer, or another software program, can then put the blocks together.

The illustrative embodiments also provide a gateway for facilitating communication between clients and the application programming interfaces.

A uniform resource identifier may take the form of a web address, a universal resource identifier, a uniform resource locator, or some other type of identifier. The illustrative embodiments recognize that uniform resource identifiers that reference application programming interfaces, and thereby, the resources associated with these application programming interfaces, may change over time. Consequently, it may be desirable to have a fixed way of referencing these resources.

Thus, the illustrative embodiments provide a method and apparatus for facilitating communication between a client and a resource. In one illustrative example, a method for facilitating access to a resource is provided. A gateway receives a request from a client. The request includes a uniform resource identifier that references an interface associated with the resource. The gateway identifies a method type of the request and a path component count of path components in the uniform resource identifier. The gateway successively matches path components of the uniform resource identifier to a corresponding character sequence in a set of candidate sequences. The set of candidate sequences is identified based on the method type, the path component count, and any previously matched corresponding character sequences. The gateway identifies a context resource identifiers for the resource based on the method type, the path component count, and the matched corresponding character sequences. The gateway sends the request to the resource according to the context resource identifiers.

Figure 1:
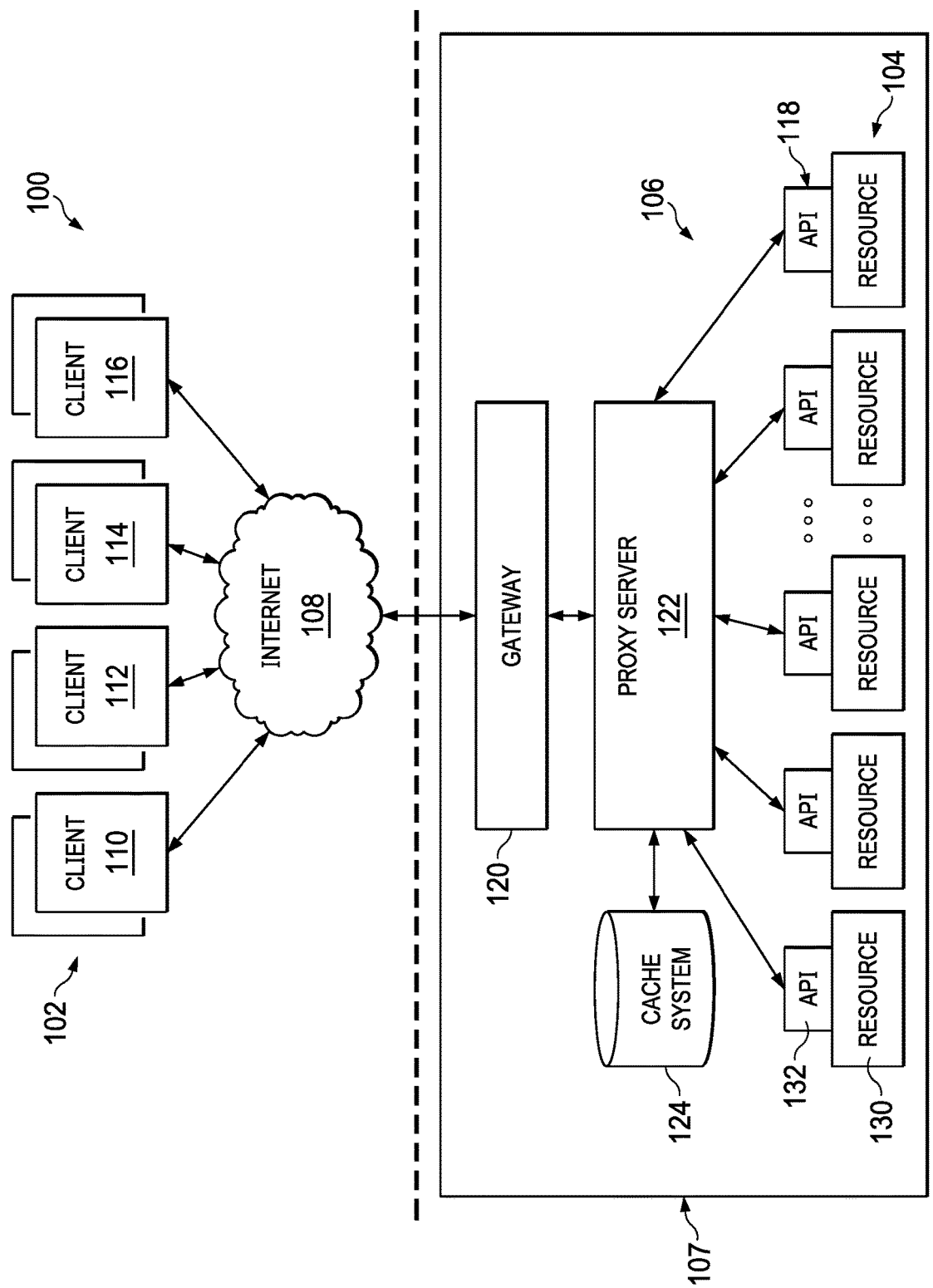
FIG. 1 is an illustration of a web services system in the form of a block diagram in accordance with an illustrative embodiment.

Referring now to the figures and, in particular, with reference to FIG. 1, an illustration of a web services system is depicted in the form of a block diagram in accordance with an illustrative embodiment. In this illustrative example, web services system 100 is an example of a system that enables communications between various software systems through one or more computer networks.

The one or more computer networks may include at least one of the Internet, a private network, a public network, or some other type of network. As used herein, the phrase "at least one of," when used with a list of items, means different combinations of one or more of the listed items may be used, and only one of the items in the list may be needed. The item may be a particular object, thing, step, operation, process, or category. In other words, "at least one of" means any combination of items or number of items may be used from the list, but not all of the items in the list may be required.

For example, and without limitation, "at least one of item A, item B, or item C" or "at least one of item A, item B, and item C" may mean item A; item A and item B; item B; item A, item B, and item C; item B and item C; or item A and C. In some cases, "at least one of item A, item B, or item C" or "at least one of item A, item B, and item C" may mean, but is not limited to, two of item A, one of item B, and ten of item C; four of item B and seven of item C; or some other suitable combination.

In this illustrative example, web services system 100 enables communications between plurality of clients 102 and plurality of resources 104. Each client of plurality of clients 102 may also be referred to as a service requestor. Each resource of plurality of resources 104 may also be referred to as a service provider that provides one or more services. In this manner, plurality of clients 102 and plurality of resources 104 may also be referred to as a plurality of service requestors and a plurality of service providers, respectively.

Each client of plurality of clients 102 and each resource of plurality of resources 104 may take the form of software. Further, each client in plurality of clients 102 and each resource of plurality of resources 104 may be run on one or more computer devices. For example, a client of plurality of clients 102 may be implemented on hardware that includes at least one of a computer system, a processor unit, a microprocessor, a tablet, a laptop, a smart television, a smartphone, or some other type of data processing system or electronic device. Similarly, a resource of plurality of resources 104 may be implemented on hardware that includes at least one of a computer system, a processor unit, a microprocessor, a tablet, a laptop, a smart television, a smartphone, a server, or some other type of data processing system or electronic device.

In this illustrative example, plurality of resources 104 are affiliated with entity 106. Entity 106 may take the form of, for example, and without limitation: a business entity, an organization, a corporation, or some other type of entity.

As depicted, plurality of resources 104 may be connected to internal network 107. In this illustrative example, internal network 107 may be in communication with internet 108. Internet 108 may refer to the common use of e term "Internet." In some cases, internet 108 may refer to a group of networked computers or a group of interconnected computer networks. Plurality of clients 102 may attempt to access plurality of resources 104 through internet 108.

As depicted, plurality of clients 102 includes client 110, client 112, client 114, and client 116. Client 110, client 112, client 114, and client 116 may be affiliated with the same entity or different entities. In other illustrative examples, one or more of client 110, client 112, client 114, and client 116 may be affiliated with entity 106. In one illustrative example, each of these clients may take the form of a consumer application, an email client, a web browser, a login application, or some other type of software component.

Web services system 100 includes plurality of resources 104, plurality of interfaces 118 associated with plurality of resources 104, gateway 120, proxy server 122, and cache system 124. Each resource of plurality of resources 104, each interface of plurality of interfaces 118, gateway 120, proxy server 122, and cache system 124 may be connected to internal network 107. A resource in plurality of resources 104 may take the form of, for example, and without limitation, a human resources service, a payroll service, an employee benefits service, a search engine, a research service provider, a governmental service provider, or some other type of service provider.

Each interface in plurality of interfaces 118 is associated with a corresponding resource of plurality of resources 104. In this illustrative example, each interface in plurality of interfaces 118 may also be referred to as an application programming interface (API). In this manner, plurality of resources 104 may also be referred to as a plurality of application programming interfaces (APIs).

Gateway 120 and proxy server 122 may be used to facilitate communications between plurality of clients 102 and plurality of resources 104. Gateway 120 and proxy server 122 may each be implemented using software, hardware, firmware, or a combination thereof. Depending on the implementation, gateway 120 and proxy server 122 may be implemented on the same computer device or on different computer devices that are in communication with each other. In this illustrative example, gateway 120 and proxy server 122 may communicate over internal network 107. However, in other illustrative examples, gateway 120 may communicate with proxy server 122 over internet 108.

In one illustrative example, client 112 may send a request for access to data provided by resource 130 over internet 108 to gateway 120. Gateway 120 uses the request to identify interface 132 associated with resource 130. If client 112 is authorized to access interface 132, gateway 120 passes along the request through proxy server 122 to interface 132.

Gateway 120 and proxy server 122 may be in communication with cache system 124. Cache system 124 may include any number of caches. Gateway 120, and proxy server 122, may use cache system 124 to store profiles for users and other types of information.

In these illustrative examples, web services system 100 takes the form of a dynamic and distributed web services system. This dynamic and distributed web services system facilitates communications between plurality of clients 102 and plurality of resources 104, while allowing clients and resources to join and leave the dynamic and distributed web services system over time. In other words, the functions performed by proxy server 122 and gateway 120 enable clients to connect to, or disconnect from, gateway 120 and resources to connect to, or disconnect from, proxy server 122 in an organic and fluid manner over time. This type of dynamic and distributed web services system may reduce the overall time, and processing resources, needed to facilitate communications between clients and resources.

The functions performed by gateway 120 are described in greater detail below in FIG. 2. Further, the functions performed by proxy server 122 are described in greater detail below in FIG. 3.

Figure 2:
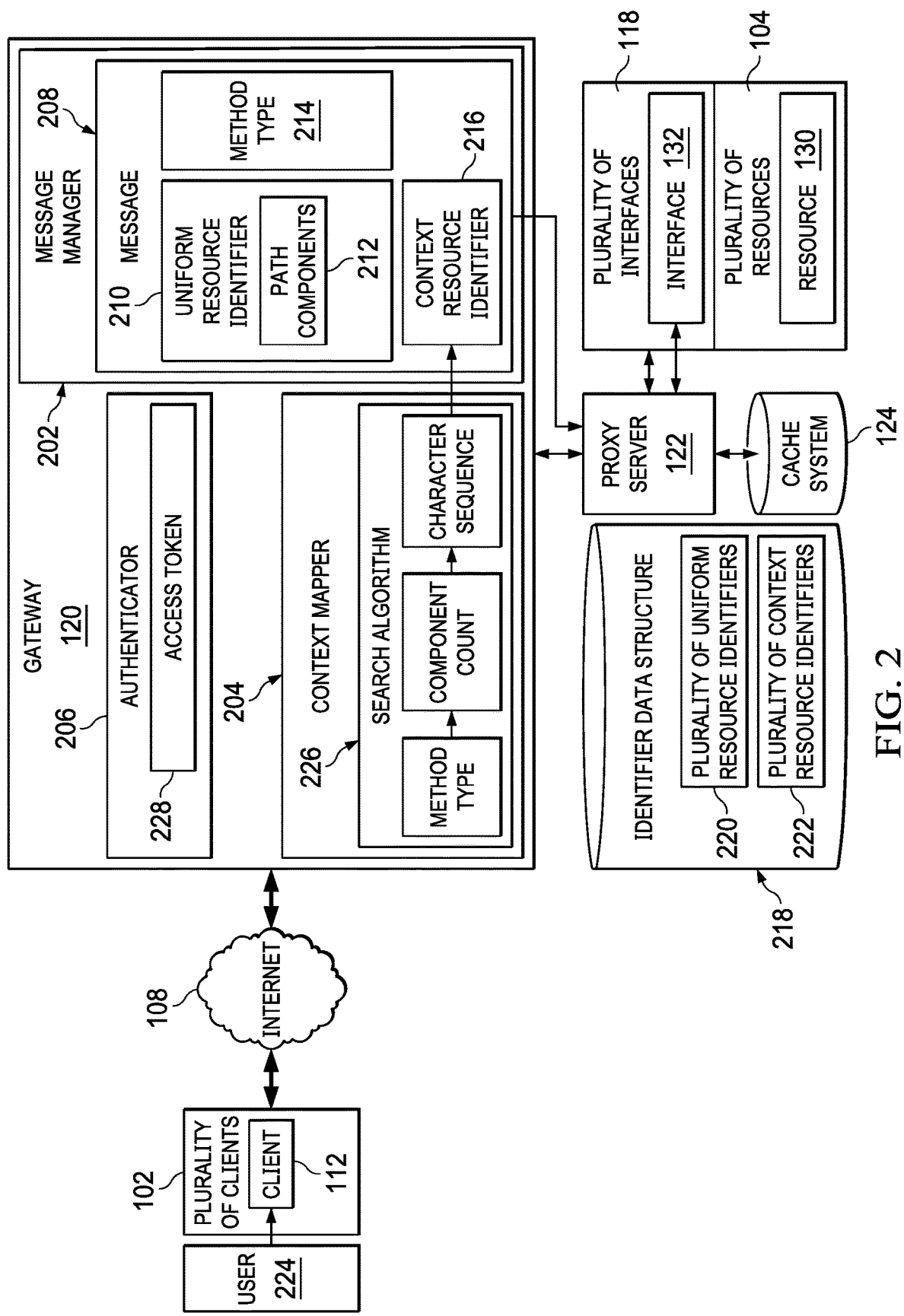
FIG. 2 is an illustration of a gateway in the form of a block diagram in accordance with an illustrative embodiment.

With reference now to FIG. 2, an illustration of gateway 120 from FIG. 1 is depicted in the form of a block diagram in accordance with an illustrative embodiment. As depicted, gateway 120 is in communication with internet 108 and proxy server 122. Gateway 120 is implemented such that gateway 120 is customized. In some cases, gateway 120 may be referred to as a customized web services gateway.

Gateway 120 includes message manager 202, context mapper 204, and authenticator 206. Each of message manager 202, context mapper 204, and authenticator 206 may be implemented using software, hardware, firmware, or a combination thereof.

Message manager 202 of gateway 120 receives message 208 from client 112 from FIG. 1. In one illustrative example, message 208 may include a request for access to data that is provided by at least one resource of plurality of resources 104 in FIG. 1.

As depicted, message 208 also includes uniform resource identifier (URI) 210 that references the particular resource of plurality of resources 104 in FIG. 1 from which the data is being requested. In this illustrative example, uniform resource identifier 210 references, or represents, interface 132 associated with resource 130 from FIG. 1. Thus, uniform resource identifier 210 also references resource 130 associated with interface 132.

As one illustrative example, uniform resource identifier 210 may be comprised of path components 212 including, but not limited to: a domain component, a service component, a feature component, a function component, a user identification component, and an operation component. One illustrative example for uniform resource identifier 210 may be as follows:

"http://adp.com/hr/vr1/associates/ABC12345/contacts"

As depicted, message 208 also includes method type 214 that indicates a desired action to be performed on resource 130 referenced by uniform resource identifier 210. In this illustrative example, method type 214 is a HyperText Transfer Protocol (HTTP) defined method that indicates a desired action. For example, method type 214 can be from a group of method requests including GET requests, PUT requests, POST requests, and DELETE requests, as well as other appropriate method requests.

Context mapper 204 of gateway 120 transforms uniform resource identifier 210 into context resource identifier 216 that also references interface 132, and thereby, resource 130. For example, and without limitation, context mapper 204 of gateway 120 may have access to identifier data structure 218 that stores plurality of uniform resource identifiers 220 and plurality of context resource identifiers 222. Identifier data structure 218 may take the form of a table, a spreadsheet, a database, a word document, a cache, a data store, a tree or some other type of data structure.

Each of plurality of uniform resource identifiers 220 may match to a corresponding one of context resource identifiers 222 in identifier data structure 218. Each corresponding pair of uniform resource identifier and context resource identifier may reference a same interface and thereby, a same resource.

The uniform resource identifier that references a particular interface, and thereby, a particular resource, may change over time. However, the corresponding context resource identifier that references that particular interface, and thereby, that particular resource, may remain static and fixed over time.

Context mapper 204 uses uniform resource identifier 210 in message 208 to look up the corresponding context resource identifier 216 in identifier data structure 218. In one illustrative example, context resource identifier 216 may include elements that more descriptively reference interface 132 and thereby resource 130, as compared to uniform resource identifier 210.

For example, and without limitation, context resource identifier 216 may be represented or defined within the scope of a larger domain for entity 106. In one illustrative example, when entity 106 is a business entity involved with human capital management, context resource identifier 216 may be represented or defined within the scope of the human capital management domain. Context resource identifier 216 may take the form of a functional decomposition of the human capital management domain to provide clarity and uniqueness with respect to this domain. In some illustrative examples, context resource identifier 216 may have a format similar to uniform resource identifier 210 for ease and understanding.

As one illustrative example, context resource identifier 216 may be comprised of segments including, but not limited to, a domain segment, a service segment, a feature segment, a function segment, and an operation segment. One illustrative example for context resource identifier 216 may be as follows:

"/hr/v1/associates/{AssocisteID}/contacts"

In this manner, context resource identifier 216 may describe the overall intent of uniform resource identifier 210. In some cases, context resource identifier 216 may also be referred to as a canonical identifier for interface 132.

In one illustrative embodiment, context mapper 204 applies search algorithm 226 to uniform resource identifier 210 in message 208 to look up the corresponding context resource identifier 216 in identifier data structure 218. When applied to identifier data structure, search algorithm 226 gives a constant processing time of N log N in Big 0 notation.

In contrast, processing times for known search algorithms using regular expressions to overcome dynamic path elements increased in proportion to the number of APIs searched. In a micro service environment where a number of APIs and API calls is dramatically increased, search times and easily balloon up to 1000 ms.

Authenticator 206 of gateway 120 may perform an authorization check respect to interface 132. For example, authenticator 206 may determines whether client 112 and/or user 224 is authorized to access interface 132 referenced by context resource identifier 216. This determination may be based on a number of different factors, which may include, for example, at least one of the particular devices on which: client 112 is being run, the type of client 112, a current time of day, a current date, or some other type of factor. As one illustrative example, authenticator 206 may confirm whether user 224 has a valid subscription to resource 130. The subscription may be, for example, held by an organization that uses or manages client 112. Authenticator 206 may issue access token 228 to client 112 in response to the authorization check.

Proxy server 122 processes message 208 received from gateway 120. Proxy server 122 routes message 208 to resource 130 according to context resource identifier 216.

In this manner, gateway 120 facilitates communication between client 112 and proxy server 122. Gateway 120 provides one level of authorization prior to request messages from client 112 being sent to proxy server 122. Further, gateway 120 may decouple proxy server 122 from plurality of clients 102 that are external to internal network 107 in FIG. 1. Further, gateway 120 may shield proxy server 122 from changes to the uniform resource identifiers that reference various interfaces over time.

The illustrations of web services system 100 and gateway 120 in FIGS. 1-2 are not meant to imply physical or architectural limitations to the manner in which an illustrative embodiment may be implemented. Other components in addition to, or in place of, the ones illustrated may be used. Some components may be optional. Also, the blocks are presented to illustrate some functional components. One or more of these blocks may be combined, divided, or combined and divided into different blocks when implemented in an illustrative embodiment.

Figure 3:
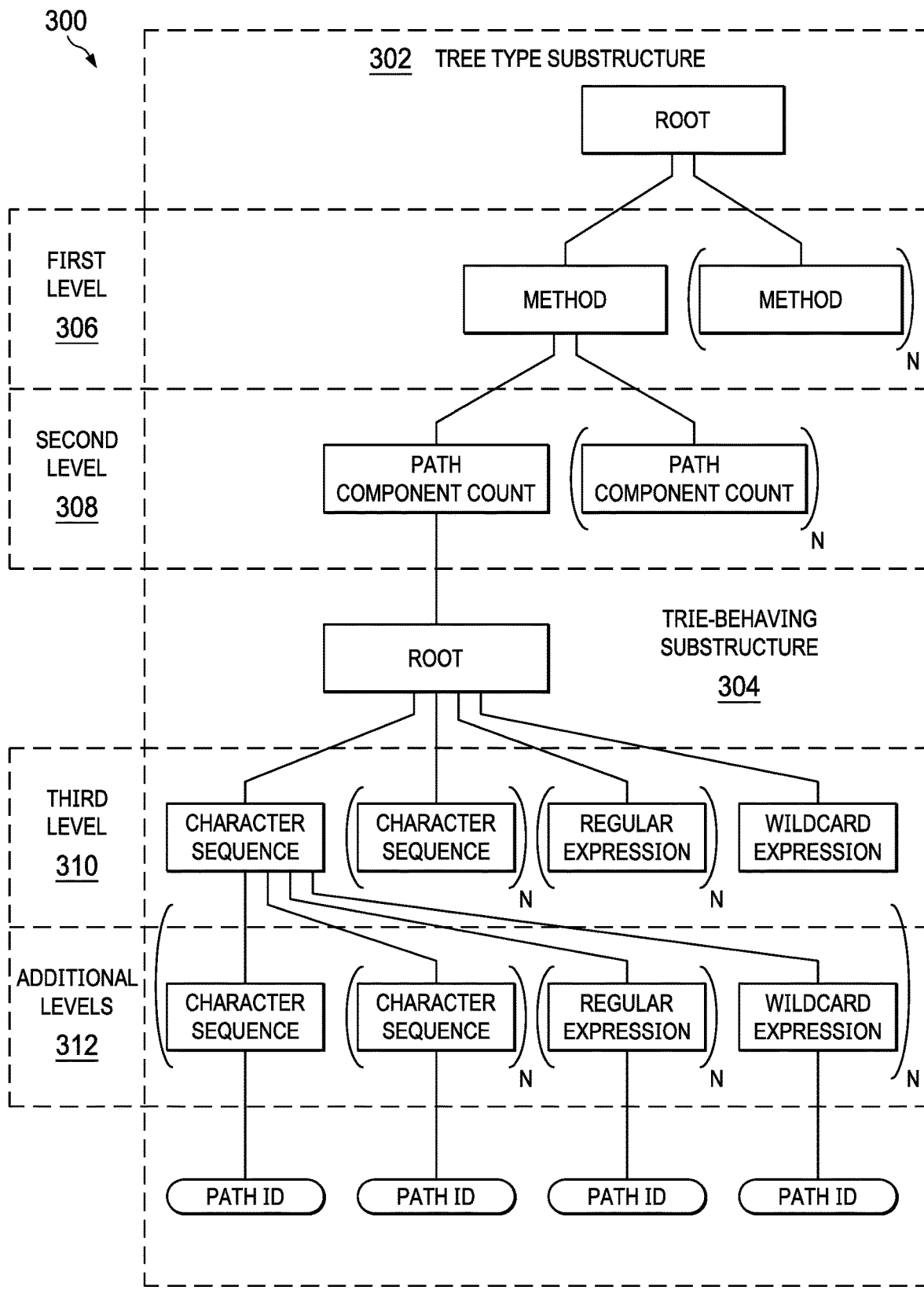
FIG. 3 is an illustration of a hybrid data structure for facilitating access to a plurality of resources in accordance with an illustrative embodiment.

With reference now to FIG. 3, an illustration of a hybrid data structure for facilitating access to a plurality of resources is depicted in accordance with an illustrative embodiment. Hybrid data structure 300 illustrated in FIG. 3 is an example of identifier data structure 218 described in FIG. 2.

Hybrid data structure 300 can include a number of substructures. As depicted, hybrid data structure 300 includes tree-behaving substructure 302 and trie-behaving substructure 304.

Tree-behaving substructure 302 includes first level 306 and second level 308. Different nodes in first level correspond to different http method types. Different nodes in second level 308 correspond to different path component counts.

A search algorithm, such as search algorithm 226 of FIG. 2, matches incoming HTTP method requests to a method type in first level 306. Matches in second level 308 are based on a count of path components in the incoming HTTP method requests.

Path component counts in second level 308 are matched according to a "less than or equal to" matching policy. In this manner, the search algorithm can account for Open Data Protocol (OData) messages having additional appended path components. Nodes in second level 308 are searched recursively, starting with the node that is "equal to" the path component count of the incoming HTTP method request.

Trie-behaving substructure 304 includes third level 310 and one or more additional levels 312. Different nodes in third level 310 correspond to a registered character sequence for a first level path component. Subsequent path components correspond sequentially to subsequent additional levels 312.

A search algorithm, such as search algorithm 226 of FIG. 2, sequentially matches incoming subsequent path components in the HTTP method requests to character sequences in descending levels of trie-behaving substructure 304. Matches in third level 310 and additional levels 312 are based the particular character sequence for a corresponding node.

In an illustrative example, a search algorithm first attempts an exact match between a path component and all registered character sequences. If an exact match is not found, the search algorithm next attempts to match the path component to one or more regular expression sequences.

Finally, if a regular expression match is not found, the search algorithm next uses a wildcard expression to match the path component.

Figure 4:
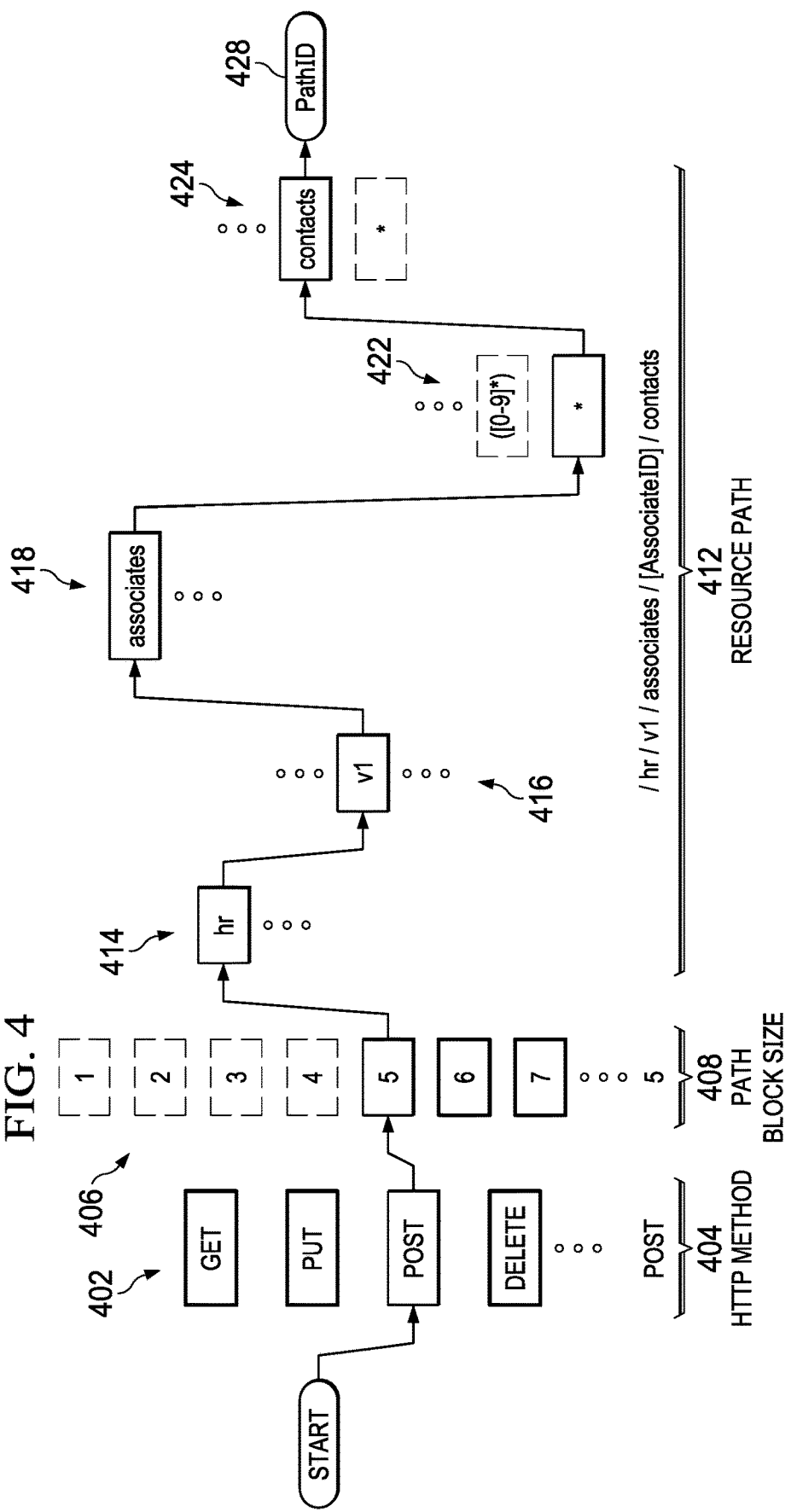
FIG. 4 is an illustration of a data flow for facilitating access to a plurality of resources in the form of a flowchart in accordance with an illustrative embodiment.

Search Path component counts in second level 308 are matched according to a "less than or equal to" matching policy. In this manner, the search algorithm can account for Open Data Protocol (OData) messages having additional appended path components. Nodes in second level 308 are searched recursively, starting with the node that is "equal to" the path component count of the incoming HTTP method request. With reference now to FIG. 4, an illustration of a data flow for facilitating access to a plurality of resources is depicted in the form of a flowchart in accordance with an illustrative embodiment. The process illustrated in FIG. 4 may be implemented using gateway 120 described in FIGS. 1-2, using search algorithm 226 of FIG. 2 and hybrid data structure 300 of FIG. 3.

In the current example, the Gateway receives the following API call:
   POST: http://adp.com/hr/v1/associates/ABC12345/contacts At step 402, the search algorithm first matches the HTTP method 404 of a received message to "POST" in the first level of the hybrid data structure. At step 406, the search algorithm matches the path component count 408 to "5" in the second level of the hybrid data structure.

Search Path component count 408 are matched according to a "less than or equal to" matching policy. In this manner, the search algorithm can account for Open Data Protocol (OData) messages having additional appended path components. Nodes in second level of the hybrid data structure are searched recursively, starting with the node that is "equal to" the path component count of the incoming HTTP method request. Therefore, in the current example, if a match is not ultimately found for a path component count 408 of "5", the search algorithm iterates back to search the path component count 408 of "4."

Continuing with the current example, the search algorithm exact matches the path component "hr" of resource path 412 to a registered character sequence in the fourth level of the hybrid data structure at step 414. The search algorithm then exact matches the path component "v1" of resource path 412 to a registered character sequence in the fifth level of the hybrid data structure at step 416, and exact matches the path component "associates" of resource path 412 to a registered character sequence in the sixth level of the hybrid data structure at step 418.

Continuing with the current example, the path component "{AssociateID}" in resource path 412 is a dynamic path element. The search algorithm first attempts, and fails, to match "ABC12345" using the registered exact match patterns. The search algorithm next uses one or more wildcard sequences, ordered based on their restrictiveness. In the current example, the regular expression of only digit characters fails to match the "ABC12345" in the received API call. The search algorithm then resorts to the wildcard sequence at 422.

Continuing with the current example, the search algorithm exact matches the path component "contacts" resource path 412 to a registered character sequence in the next level of the hybrid data structure at step 424. The exact match sequence takes precedence over the wildcard matching. Since the path component "contacts" is the last path component and node traversal is finished with the leaf node, the search algorithm matches, at step 428, the incoming API call to the resource path indicated by the leaf node. The Gateway routes the API request according to the identified resource path.

Figure 5:
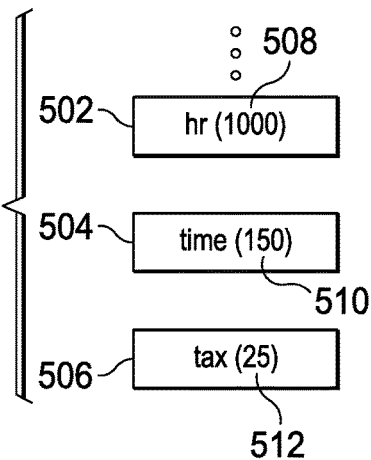
FIG. 5 is an illustration of a number of nodes within a common level of a hybrid data structure in accordance with an illustrative embodiment.

With reference now to FIG. 5, an illustration of a number of nodes within a common level of a hybrid data structure is depicted in accordance with an illustrative embodiment. The nodes illustrated in FIG. 5 may be implemented using hybrid data structure 300 described in FIG. 3.

In this illustrative example, a level of a hybrid data structure contains nodes 502, 504, and 506, each having an associated counter 508, 510, and 512, respectively. Counter 508, 510, and 512 enable frequency ordering of nodes 502, 504, and 506 within the data structure level. For example, counter 508, 510, and 512 enable dynamic sorting to be applied within the exact match bucket, and regular express bucket. Therefore, the search algorithm preferentially searches nodes within a particular match bucket that are more frequently matched to incoming API requests.

In the illustrative example, a level of the hybrid data structure containing nodes 502, 504 and 506 can be implemented using a data type that allows for ordering of the nodes. For example, the level of hybrid data structure containing nodes 502, 504 and 506 can be a dictionary datatype.

Figure 6:
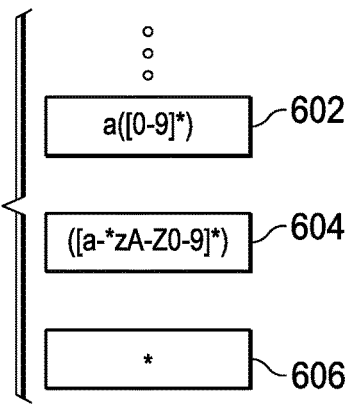
FIG. 6 is an illustration of a number of nodes within a common level of a hybrid data structure in accordance with an illustrative embodiment.

With reference now to FIG. 6, an illustration of a number of nodes within a common level of a hybrid data structure is depicted in accordance with an illustrative embodiment. The nodes illustrated in FIG. 6 may be implemented using hybrid data structure 300 described in FIG. 3.

In this illustrative example, a level of a hybrid data structure contains nodes 602, 604, and 606. Nodes 602 and 604 contain regular expression sequences. Node 606 is a wildcard sequence.

The search algorithm traverses nodes 602, 604, and 606 giving preference to more restrictive sequences. For example, node 602, matching only numeric characters, is more restrictive than node 604, matching any alphanumeric character. Similarly, both nodes 602 and 604 are more restrictive than node 606, matching all alphanumeric and symbolic characters. Therefore, after attempting any exact character matches, the search algorithm would, in order, attempt a match to node 602, then to node 604, and finally to node 606.

Figure 7:
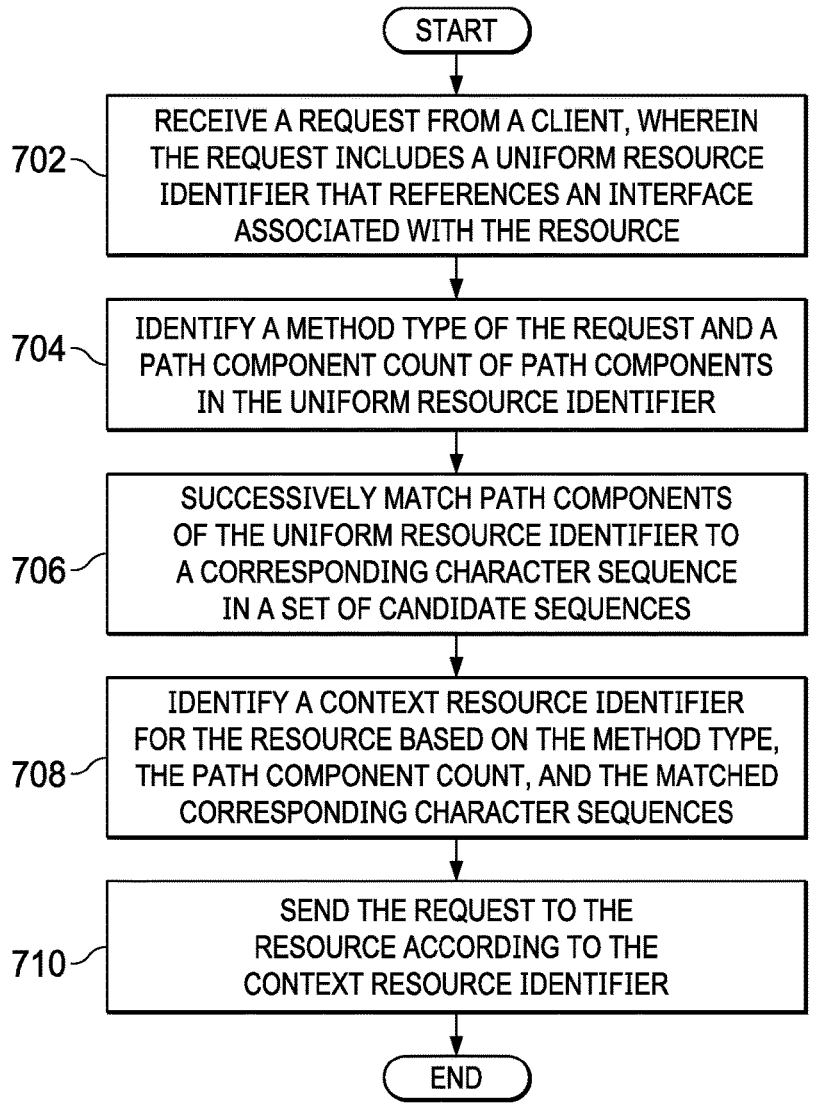
FIG. 7 is a flowchart for facilitating access to a resource in accordance with an illustrative embodiment.

With reference now to FIG. 7, an illustration of a flowchart for facilitating access to a resource is depicted in accordance with an illustrative embodiment. The process illustrated in FIG. 7 may be implemented using gateway 120 described in FIGS. 1-2, using search algorithm 226 of FIG. 2 and hybrid data structure 300 of FIG. 3.

Process 700 begins by receiving a request from a client (step 702). The request can include a uniform resource identifier that references an interface associated with resource.

Process 700 continues when it identifies a method type of the request and a path component count of the path components in the uniform resource identifier (step 704).

Process 700 then successively matches have components of the uniform resource identifier to a corresponding character sequence in a set of character sequences (step 706). The set of candidate sequences is identified based on the method type, the path component count, and any previously matched corresponding character sequences.

The process 700 then identifies a context resource identifier for the resource based on the method type, the path component count, and the matched corresponding character sequences (step 708).

The process 700 then sends the request to the resource according to the context resource identifier (step 710), with the process terminating thereafter.

Figure 8:
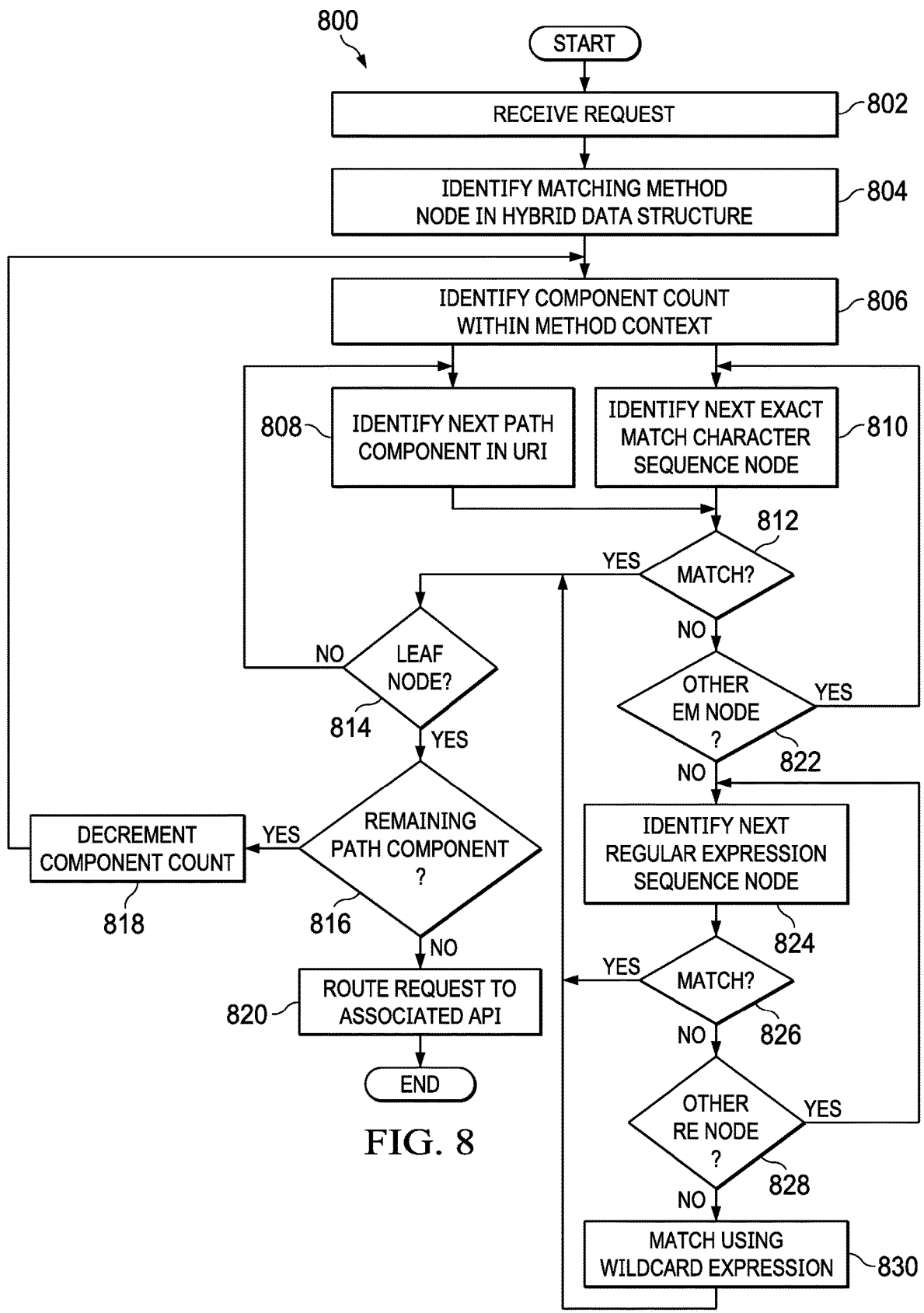
FIG. 8 is another flowchart for facilitating access to a resource in accordance with an illustrative embodiment.

With reference now to FIG. 8, an illustration of a flowchart for facilitating access to a resource is depicted in accordance with an illustrative embodiment. The process illustrated in FIG. 8 is an exemplary more detailed embodiment of the process illustrated in FIG. 7.

Process 800 begins by receiving a request from a client (step 802). The request can include a uniform resource identifier that references an interface associated with resource.

Process 800 identifies a matching method node in a hybrid data structure (step 804). Process 800 then identifies a matching path component count node within the method context (step 806).

Process 800 then identifies a next path component in the uniform resource identifier of the received method request (step 808), and a next exact match character sequence node in the hybrid data structure (step 810). Process 800 then compares the current path component to the current character sequence (step 812).

If the current path component matches the current character sequence ("yes" at step 812), the process determines if the current node in the hybrid data structure is a leaf node (step 814). If the current node in the hybrid data structure is not a leaf node ("no" at step 814), the process iterates back to step 808 to identify the next path component in the uniform resource identifier.

If the current node in the hybrid data structure is a leaf node ("yes" at step 814), the process determines whether there are remaining path components in the received uniform resource identifier (step 816). If there are remaining path components in the received uniform resource identifier ("yes" at step 816), the process decrements the path component (step 818), and iterates back to step 806.

If there are no remaining path components in the received uniform resource identifier ("no" at step 816), the process routes the request to the associated API according to the context resource identifier associated with the leaf node (step 820), with the process terminating thereafter.

Returning now to step 812, if the current path component does not match the current character sequence ("no" at step 812), the process determines whether there are additional exact match nodes (822). If there are additional exact match nodes in the hybrid data structure ("yes" at step 822), the process iterates back to step 810, attempting to exact match the current path component to a registered character sequence.

If there are not additional exact match nodes in the hybrid data structure ("no" at step 822), the process identifies a next regular expression character sequence node in the hybrid data structure (step 824). Process 800 then compares the current path component to the current character sequence (step 826).

If the current path component matches the regular expression character sequence ("yes" at step 826), the process iterates to step 814 to determine if the current node in the hybrid data structure is a leaf node. If the current path component does not match the current regular expression sequence ("no" at step 826), the process determines whether there are additional regular expression nodes (828). If there are additional regular expression nodes in the hybrid data structure ("yes" at step 828), the process iterates back to step 824, attempting to exact match the current path component to another, possibly less restrictive, regular expression character sequence. If there are not additional regular expression nodes in the hybrid data structure ("no" at step 828), the process matches the path component to a node using a wildcard expression (step 830), and iterates back to step 814.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 9:
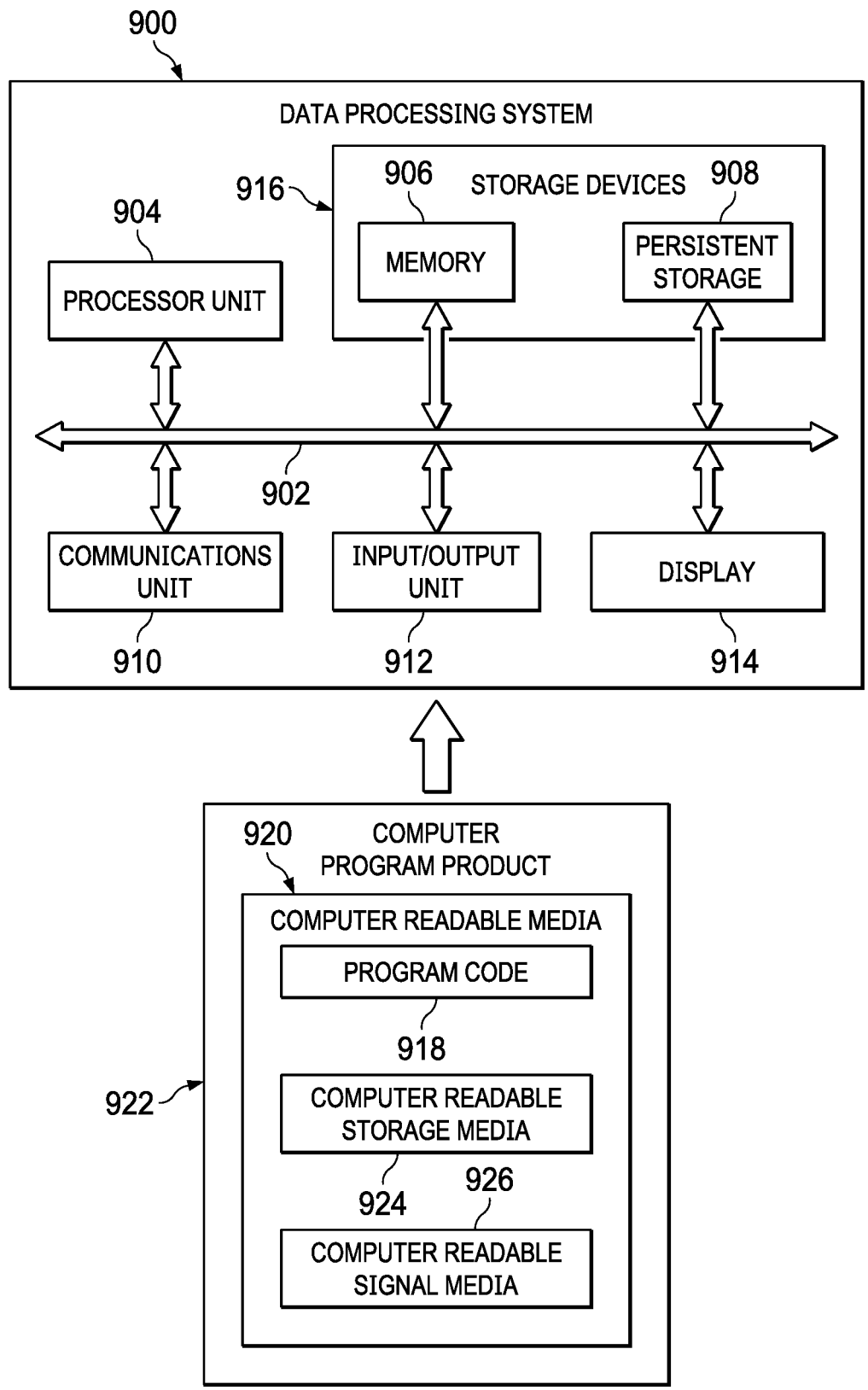
FIG. 9 is an illustration of a data processing system in the form of a block diagram in accordance with an illustrative embodiment.

Turning now to FIG. 9, an illustration of a data processing system in the form of a block diagram is depicted in accordance with an illustrative embodiment. Data processing system 900 may be used to implement proxy server 122, gateway 120, or both from FIGS. 1-2. As depicted, data processing system 900 includes communications framework 902, which provides communications between processor unit 904, storage devices 906, communications unit 908, input/output unit 910, and display 912. In some cases, communications framework 902 may be implemented as a bus system.

Processor unit 904 is configured to execute instructions for software to perform a number of operations. Processor unit 904 may comprise a number of processors, a multiprocessor core, and/or some other type of processor, depending on the implementation. In some cases, processor unit 904 may take the form of a hardware unit, such as a circuit system, an application specific integrated circuit (ASIC), a programmable logic device, or some other suitable type of hardware unit.

Instructions for the operating system, applications, and/or programs run by processor unit 904 may be located in storage devices 906. Storage devices 906 may be in communication with processor unit 904 through communications framework 902. As used herein, a storage device, also referred to as a computer readable storage device, is any piece of hardware capable of storing information on a temporary and/or permanent basis. This information may include, but is not limited to, data, program code, and/or other information.

Memory 914 and persistent storage 916 are examples of storage devices 906. Memory 914 may take the form of, for example, a random access memory or some type of volatile or non-volatile storage device. Persistent storage 916 may comprise any number of components or devices. For example, persistent storage 916 may comprise a hard drive, a flash memory, a rewritable optical disk, a rewritable magnetic tape, or some combination of the above. The media used by persistent storage 916 may or may not be removable.

Communications unit 908 allows data processing system 900 to communicate with other data processing systems and/or devices. Communications unit 908 may provide communications using physical and/or wireless communications links.

Input/output unit 910 allows input to be received from and output to be sent to other devices connected to data processing system 900. For example, input/output unit 910 may allow user input to be received through a keyboard, a mouse, and/or some other type of input device. As another example, input/output unit 910 may allow output to be sent to a printer connected to data processing system 900.

Display 912 is configured to display information to a user. Display 912 may comprise, for example, without limitation, a monitor, a touch screen, a laser display, a holographic display, a virtual display device, and/or some other type of display device.

In this illustrative example, the processes of the different illustrative embodiments may be performed by processor unit 904 using computer-implemented instructions. These instructions may be referred to as program code, computer usable program code, or computer readable program code and may be read and executed by one or more processors in processor unit 904.

In these examples, program code 918 is located in a functional form on computer readable media 920, which is selectively removable, and may be loaded onto or transferred to data processing system 900 for execution by processor unit 904. Program code 918 and computer readable media 920 together form computer program product 922. In this illustrative example, computer readable media 920 may be computer readable storage media 924 or computer readable signal media 926.

Computer readable storage media 924 is a physical or tangible storage device used to store program code 918, rather than a medium that propagates or transmits program code 918. Computer readable storage media 924 may be, for example, without limitation, an optical or magnetic disk or a persistent storage device that is connected to data processing system 900.

Alternatively, program code 918 may be transferred to data processing system 900 using computer readable signal media 926. Computer readable signal media 926 may be, for example, a propagated data signal containing program code 918. This data signal may be an electromagnetic signal, an optical signal, and/or some other type of signal that can be transmitted over physical and/or wireless communications links.

The illustration of data processing system 900 in FIG. 9 is not meant to provide architectural limitations to the manner in which the illustrative embodiments may be implemented. The different illustrative embodiments may be implemented in a data processing system that includes components in addition to or in place of those illustrated for data processing system 900. Further, components shown in FIG. 9 may be varied from the illustrative examples shown.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for facilitating access to a resource, the method comprising:

receiving, at a gateway, a request from a client, wherein the request includes a uniform resource identifier that references an interface associated with the resource;

identifying, by the gateway, a method type of the request and a path component count of path components in the uniform resource identifier;

successively matching, by the gateway, path components of the uniform resource identifier to a corresponding character sequence in a set of candidate sequences, wherein the set of candidate sequences is identified based on the method type, the path component count, and any previously matched corresponding character sequences;

identifying, by the gateway, an context resource identifier for the resource based on the method type, the path component count, and the matched corresponding character sequences; and sending, by the gateway, the request to the resource according to the context resource identifier.

2. The method of claim 1, wherein the request is a Representational State Transfer request that references an Application Programming Interface associated with the requested web service resource.

3. The method of claim 2, wherein the method type is an HTTP defined method that indicates a desired action to be performed on the identified resource selected from a group of method requests including GET requests, PUT requests, POST requests, and DELETE requests.

4. The method of claim 1, further comprising:

matching the method type to a corresponding method in a set of candidate methods; and matching the path component count to a corresponding count in a set of candidate counts, wherein the set of candidate counts is identified based on the corresponding method.

5. The method of claim 4, wherein matching the path component count further comprises:

matching the path component count to a subset of the set of candidate counts, wherein the subset includes the corresponding count and additional counts that are less than the corresponding count; and wherein successively matching path components is recursively attempted over the subset of the set of candidate counts.

6. The method of claim 1, wherein the set of candidate sequences for a particular path component further comprises a set of registered sequences, and wherein successively matching path components further comprises:

exact matching the particular path component to one of the set of registered sequences.

7. The method of claim 6, wherein the set of candidate sequences for a particular path component further comprises a set of regular expression sequences, and wherein successively matching path components further comprises:

responsive to the particular path component not exact matching one of the set of registered sequences, matching the particular path component to one of the set of regular expression sequences.

8. The method of claim 7, wherein the set of candidate sequences for a particular path component further comprises a wildcard sequence, and wherein successively matching path components further comprises:

responsive to the particular path component not matching one of the set of regular expression sequences, matching the particular path component to the wildcard sequence.

9. The method of claim 6, wherein each of the candidate sequences has an associated counter that tracks resource requests matched to the candidate sequence, the method further comprising:

ordering the set of registered sequences within an associated set of candidate sequences based on their associated counters, such that a search order of the associated set of candidate sequences prioritizes character sequences that are more frequently matched.

10. A gateway for facilitating access to a resource, the gateway comprising:
 a hardware processor; and
 a context mapper in communication with the hardware processor, wherein the context mapper is configured:
  to receive a request from a client, wherein the request includes a uniform resource identifier that references an interface associated with the resource;
  to identify a method type of the request and a path component count of path components in the uniform resource identifier;
  to successively matches path components of the uniform resource identifier to a corresponding character sequence in a set of candidate sequences, wherein the set of candidate sequences is identified based on the method type, the path component count, and any previously matched corresponding character sequences;
  to identify an context resource identifier for the resource based on the method type, the path component count, and the matched corresponding character sequences; and
  to send the request to the resource according to the context resource identifier.

11. The gateway of claim 10, wherein the request is a Representational State Transfer request that references an Application Programming Interface associated with the requested web service resource.

12. The gateway of claim 11, wherein the method type is an HTTP defined method that indicates a desired action to be performed on the identified resource selected from a group of method requests including GET requests, PUT requests, POST requests, and DELETE requests.

13. The gateway of claim 10, wherein the context mapper is further configured:
 to match the method type to a corresponding method in a set of candidate methods; and
 to match the path component count to a corresponding count in a set of candidate counts, wherein the set of candidate counts is identified based on the corresponding method.

14. The gateway of claim 13, wherein matching the path component count further comprises:
 matching the path component count to a subset of the set of candidate counts, wherein the subset includes the corresponding count and additional counts that are less than the corresponding count; and
 wherein successively matching path components is recursively attempted over the subset of the set of candidate counts.

15. The gateway of claim 10, wherein the set of candidate sequences for a particular path component further comprises a set of registered sequences, and wherein successively matching path components further comprises:
 exact matching the particular path component to one of the set of registered sequences.

16. The gateway of claim 15, wherein the set of candidate sequences for a particular path component further comprises a set of regular expression sequences, and wherein successively matching path components further comprises:
 responsive to the particular path component not exact matching one of the set of registered sequences, matching the particular path component to one of the set of regular expression sequences.

17. The gateway of claim 16, wherein the set of candidate sequences for a particular path component further comprises a wildcard sequence, and wherein successively matching path components further comprises:
 responsive to the particular path component not matching one of the set of regular expression sequences, matching the particular path component to the wildcard sequence.

18. The gateway of claim 13, wherein each of the candidate sequences has an associated counter that tracks resource requests matched to the candidate sequence, wherein the context mapper is further configured:
 to order the set of registered sequences within an associated set of candidate sequences based on their associated counters, such that a search order of the associated set of candidate sequences prioritizes character sequences that are more frequently matched.

19. A computer program product for facilitating access to a resource, the computer program product comprising:
 a non-transitory computer readable storage media;
 program code, stored on the computer readable storage media, for receiving a request from a client, wherein the request includes a uniform resource identifier that references an interface associated with the resource;
 program code, stored on the computer readable storage media, for identifying a method type of the request and a path component count of path components in the uniform resource identifier;
 program code, stored on the computer readable storage media, for successively matching path components of the uniform resource identifier to a corresponding character sequence in a set of candidate sequences, wherein the set of candidate sequences is identified based on the method type, the path component count, and any previously matched corresponding character sequences;
 program code, stored on the computer readable storage media, for identifying an context resource identifier for the resource based on the method type, the path component count, and the matched corresponding character sequences; and
 program code, stored on the computer readable storage media, for sending the request to the resource according to the context resource identifier.

20. The computer program product of claim 19, wherein the request is a Representational State Transfer request that references an Application Programming Interface associated with the requested web service resource.

21. The computer program product of claim 20, wherein the method type is an HTTP defined method that indicates desired action to be performed on the identified resource selected from a group of method requests including GET requests, PUT requests, POST requests, and DELETE requests.

22. The computer program product of claim 19, further comprising:
 program code, stored on the computer readable storage media, for matching the method type to a corresponding method in a set of candidate methods; and
 program code, stored on the computer readable storage media, for matching the path component count to a corresponding count in a set of candidate counts, wherein the set of candidate counts is identified based on the corresponding method.

23. The computer program product of claim 22, wherein the program code for matching the path component count further comprises:
- program code, stored on the computer readable storage media, for matching the path component count to a subset of the set of candidate counts, wherein the subset includes the corresponding count and additional counts that are less than the corresponding count; and
- wherein successively matching path components is recursively attempted over the subset of the set of candidate counts.

24. The computer program product of claim 19, wherein the set of candidate sequences for a particular path component further comprises a set of registered sequences, and wherein the program code for successively matching path components further comprises:
- program code, stored on the computer readable storage media, for exact matching the particular path component to one of the set of registered sequences.

25. The computer program product of claim 24, wherein the set of candidate sequences for a particular path component further comprises a set of regular expression sequences, and wherein the program code for successively matching path components further comprises:
- program code, stored on the computer readable storage media, for matching the particular path component to one of the set of regular expression sequences in response to the particular path component not exact matching one of the set of registered sequences.

26. The computer program product of claim 25, wherein the set of candidate sequences for a particular path component further comprises a wildcard sequence, and wherein the program code for successively matching path components further comprises:
- program code, stored on the computer readable storage media, for matching the particular path component to the wildcard sequence in response to the particular path component not matching one of the set of regular expression sequences.

27. The computer program product of claim 24, wherein each of the candidate sequences has an associated counter that tracks resource requests matched to the candidate sequence, and further comprising:
- program code, stored on the computer readable storage media, for ordering the set of registered sequences within an associated set of candidate sequences based on their associated counters, such that a search order of the associated set of candidate sequences prioritizes character sequences that are more frequently matched.

* * * * *